No. 814,004. PATENTED FEB. 27, 1906.
F. L. HARMON.
AUTOMATIC MOTORY MANUFACTURING MACHINE.
APPLICATION FILED SEPT. 26, 1903.
8 SHEETS—SHEET 3.
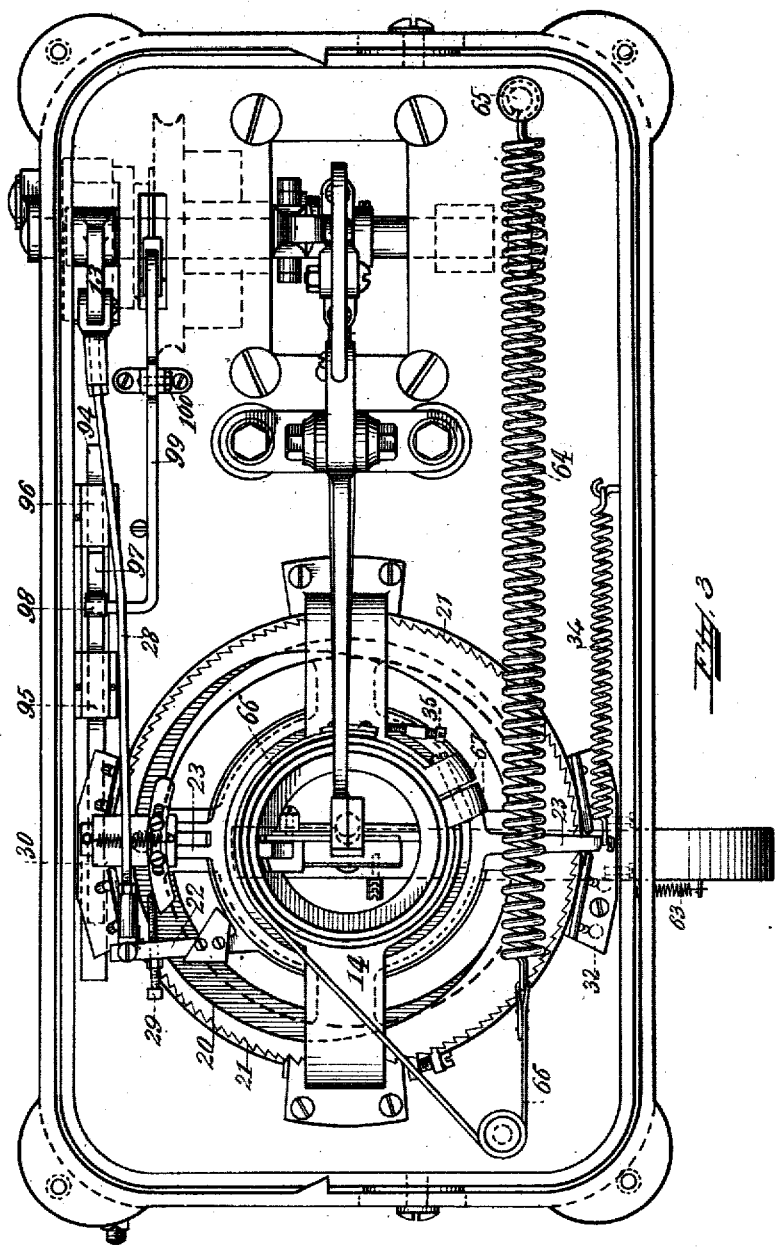
Witnesses:
Inventor:
Frank L. Harmon.

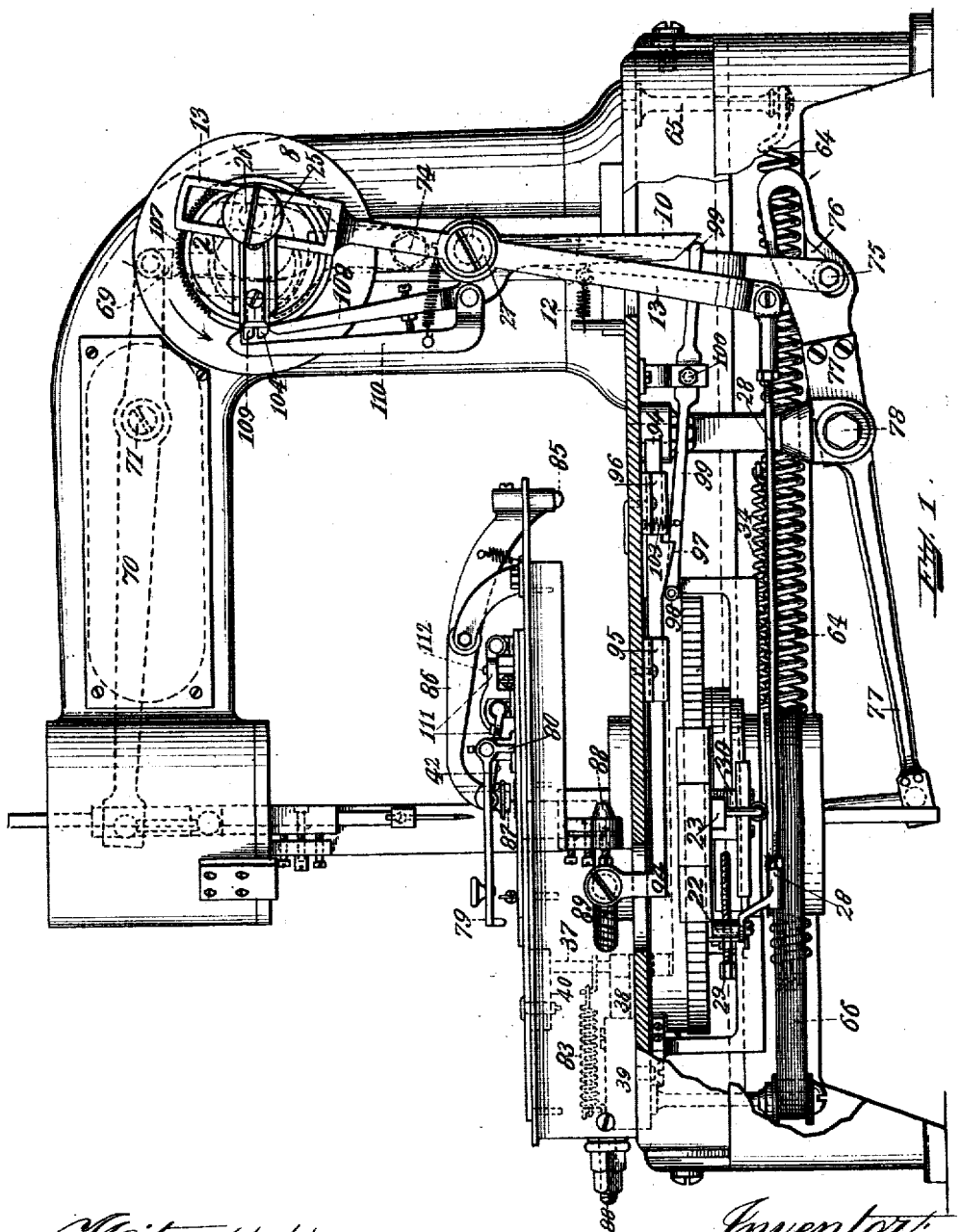

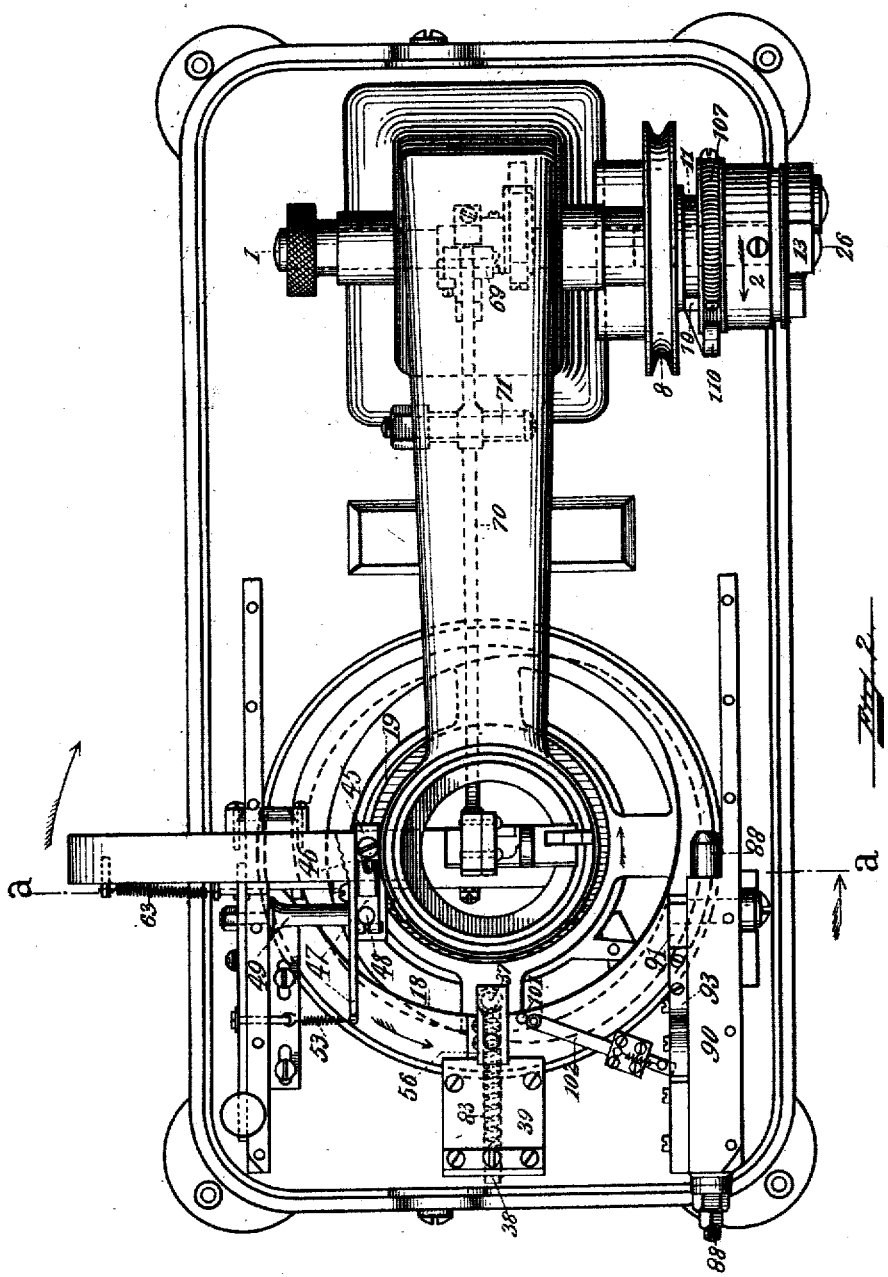

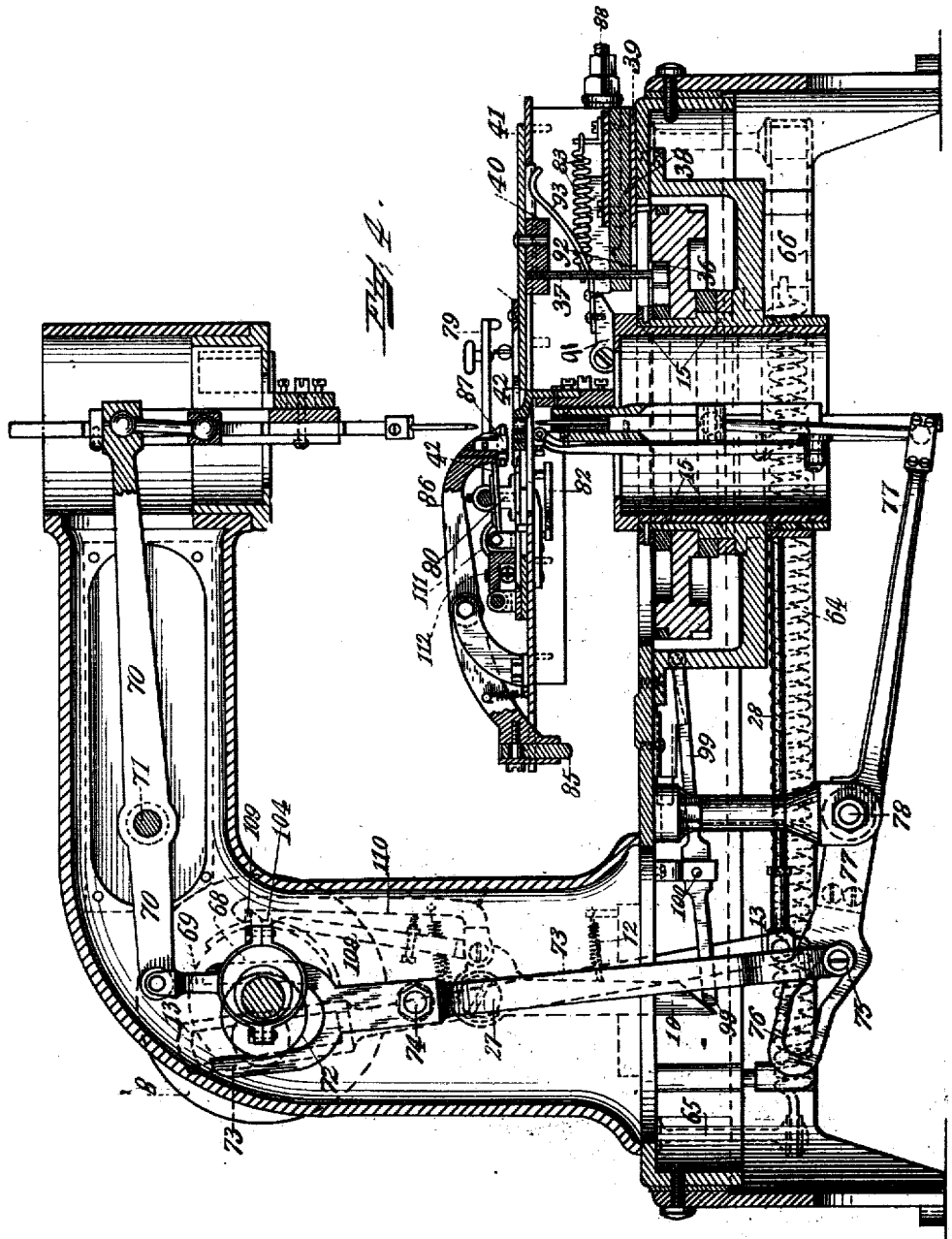

No. 814,004. PATENTED FEB. 27, 1906.
F. L. HARMON.
AUTOMATIC MOTORY MANUFACTURING MACHINE.
APPLICATION FILED SEPT. 26, 1903.
8 SHEETS—SHEET 5.
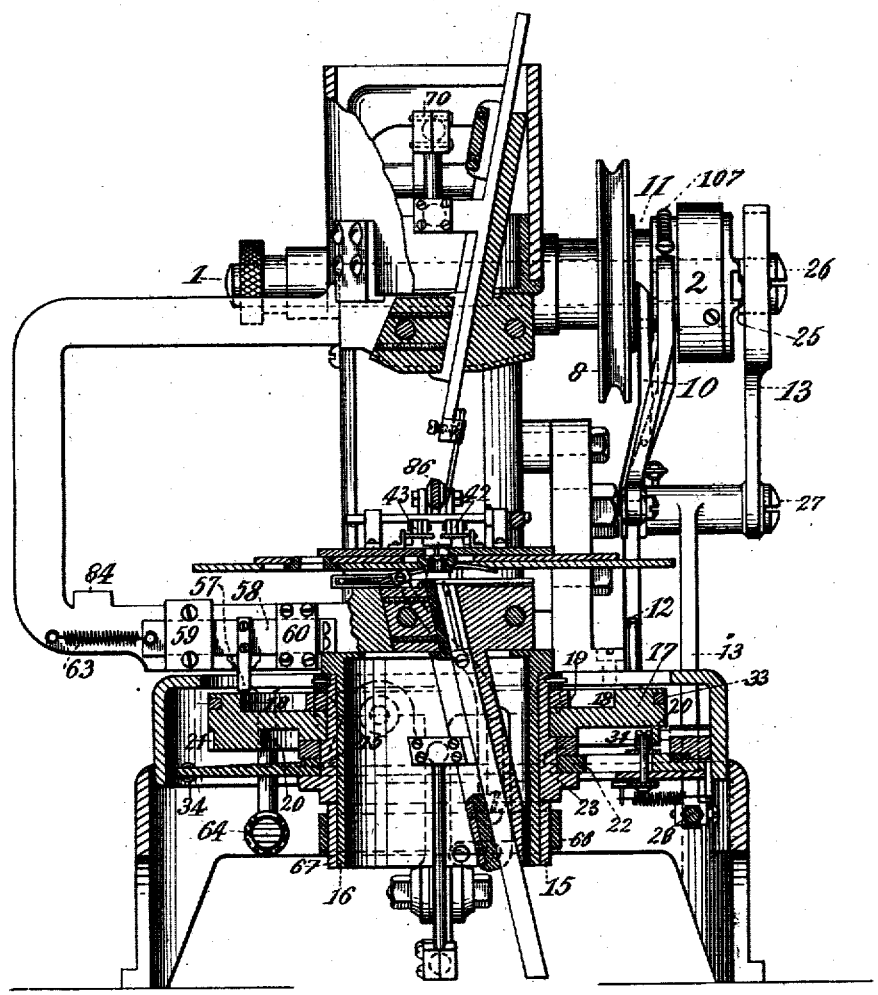
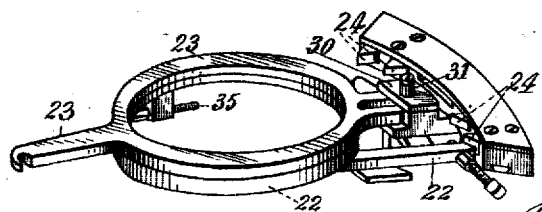
Witnesses:
H. E. Remick
N. E. Remick Jr.
Inventor:
Frank L. Harmon.

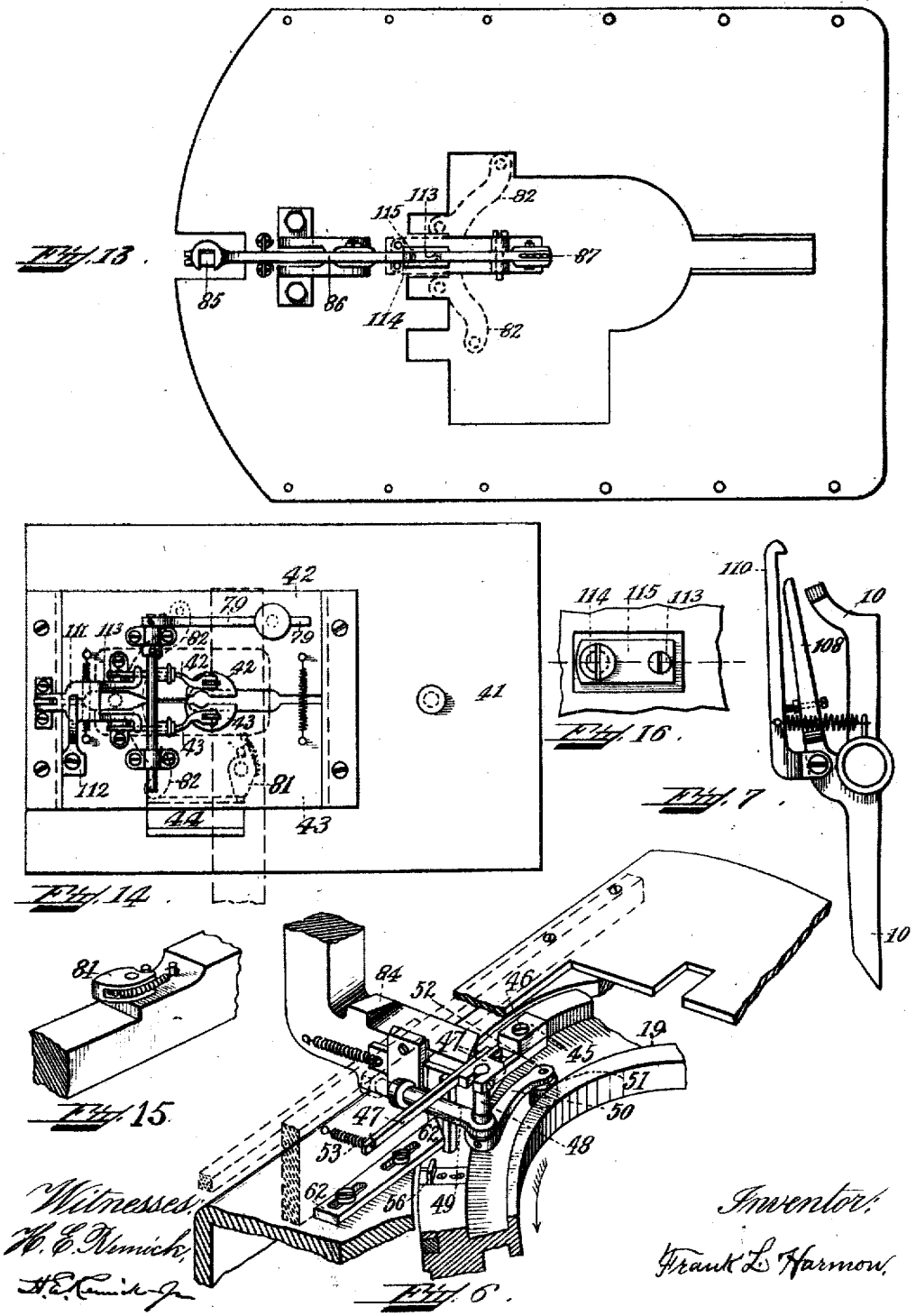

No. 814,004. PATENTED FEB. 27, 1906.
F. L. HARMON.
AUTOMATIC MOTORY MANUFACTURING MACHINE.
APPLICATION FILED SEPT. 26, 1903.
8 SHEETS—SHEET 7.
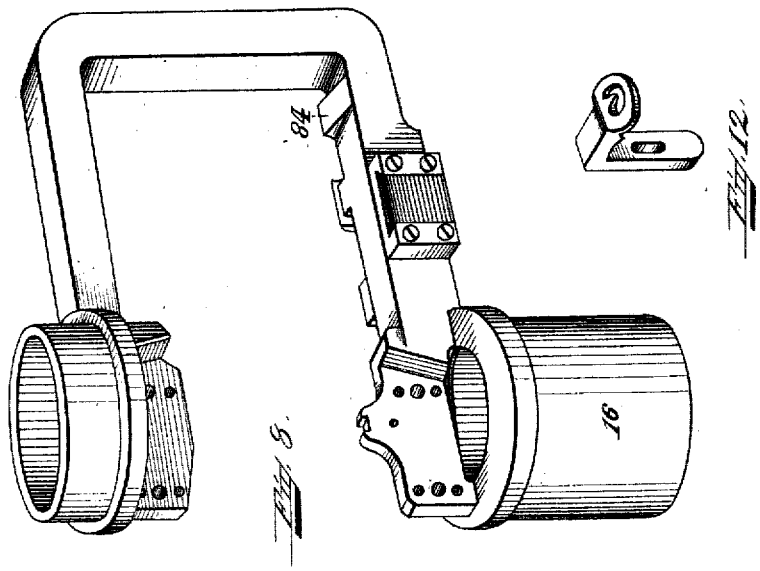
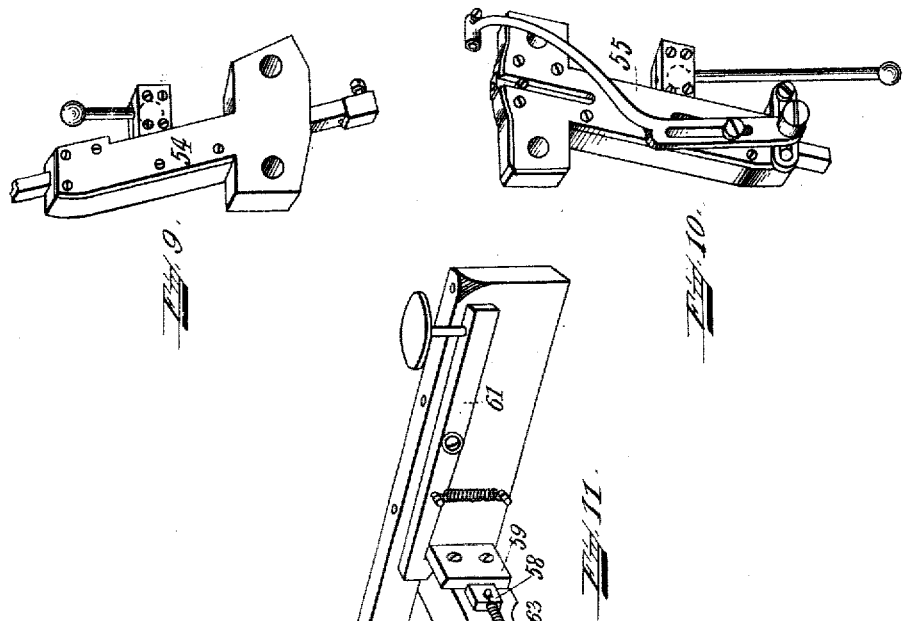
Witnesses:
H. E. Remick,
H. E. Remick Jr.
Inventor:
Frank L. Harmon.

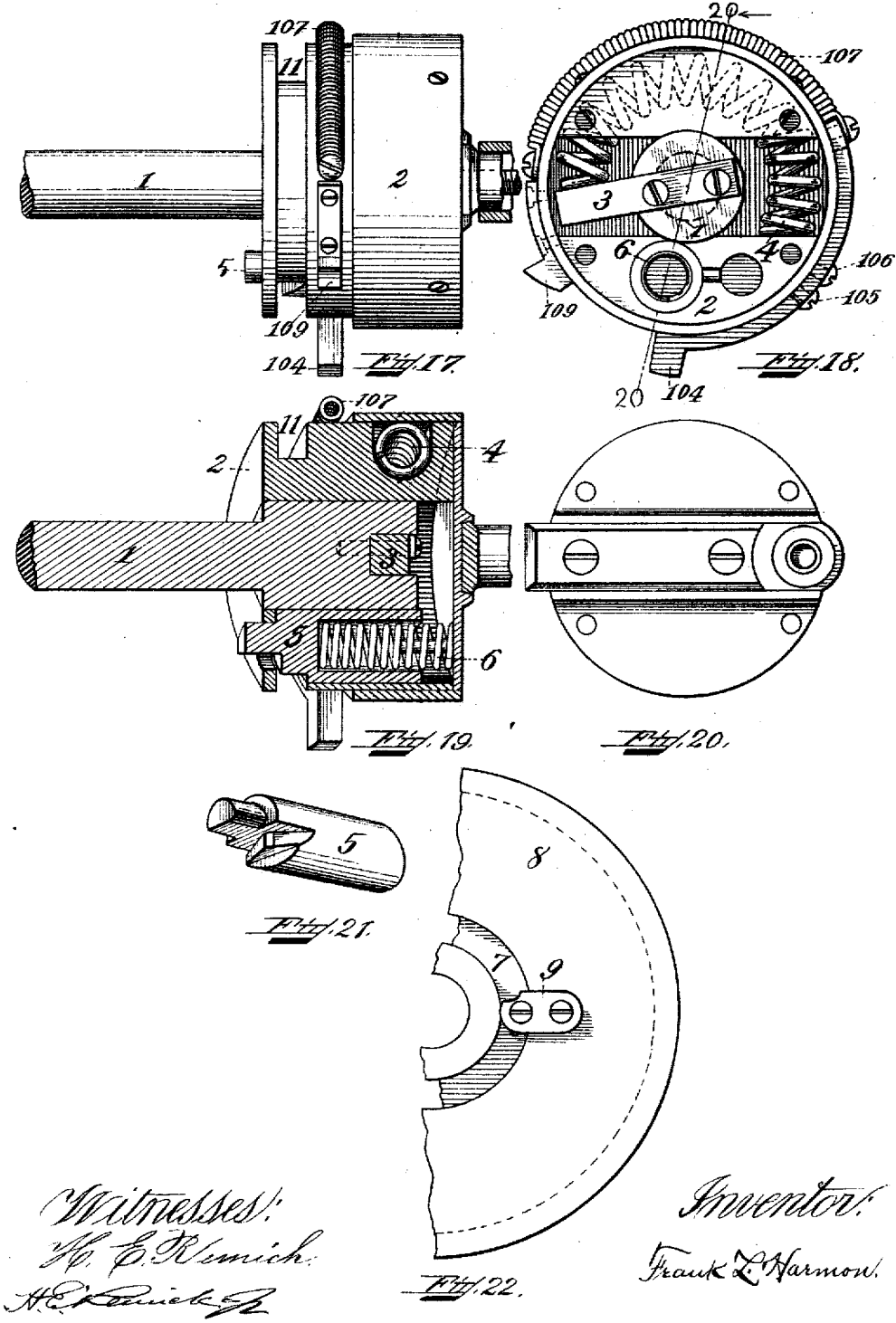

UNITED STATES PATENT OFFICE.

FRANK L. HARMON, OF BEVERLY, MASSACHUSETTS.

AUTOMATIC MOTORY MANUFACTURING-MACHINE.

No. 814,004.      Specification of Letters Patent.      Patented Feb. 27, 1906.

Original application filed November 30, 1896, Serial No. 613,906. Divided and this application filed September 26, 1903. Serial No. 174,760½.

*To all whom it may concern:*

Be it known that I, FRANK L. HARMON, of Beverly, in the county of Essex and Commonwealth of Massachusetts, have invented an Automatic Motory Manufacturing-Machine, of which the following is a specification, reference being had to the accompanying drawings.

This invention is a division of my application entitled "A machine for sewing buttonholes, overseaming, and other purposes," Serial No. 613,906, filed November 30, 1896.

This invention is embodied in a mechanism holding latent power therein while the machine is not in action, means whereupon said power may be generated at each operation of the machine, means whereupon all of the power that is generated at one operation of the machine may be utilized as motive power in one operation of the machine, means adapted to be forced by said power to aid to begin and produce an operation of the machine upon a material, and means adapted to be forced by said power to operate upon the material, and another mechanism comprising means to be operated by another distinct power and comprising means for operating upon the material, and connecting means between the two mechanisms whereupon one of the mechanisms may be utilized as an auxiliary mechanism to the other in producing or ceasing to produce an effect upon a material to be operated upon.

In the accompanying drawings, Figure 1 is a side elevation of the machine shown in the application divided, and Fig. 2 is a top plan of the same. Fig. 3 is a bottom plan, and Fig. 4 shows a longitudinal section. Fig. 5 shows a cross-section on line *a a* shown in Fig. 2. Fig. 6 illustrates mechanism whereupon a clamp-plate with clamps thereon is moved sidewise. Fig. 7 shows a stop fork or device whereupon a main mechanism is automatically stopped, and Fig. 8 illustrates a yoke for turning stitch-forming devices, and Figs. 9 and 10 show needle-bar bearings to be secured to said yoke. Fig. 11 shows a device by which power in the auxiliary mechanism may be utilized, and Fig. 12 shows a throat-plate. Fig. 13 shows a stationary work-table, and Fig. 14 shows a clamp-plate and clamps to be movably mounted upon said work-table. Fig. 15 shows a pawl device whereupon the clamp-plate is moved by stored power released and utilized. Fig. 16 shows a device whereupon a buttonhole-slit is spread. Figs. 17, 18, 19, 20, 21, and 22 show parts of a clutch mechanism, and Fig. 23 shows a feed-lever and a pawl device carried thereby and also shows a striker-lever and feed-screw carried thereby by which said feed-lever is actuated.

Numeral reference characters are used.

In Figs. 17, 18, and 19 the driving-shaft 1 is shown yieldingly connected with the clutch member 2 in consequence of the shaft being through a hole in said clutch member and in consequence of the lug 3 being fast to the shaft 1 and connected with the spring 4, so that no great shock is given to the shaft 1 by the violent starting of said clutch member. Fig. 18 shows the end of said clutch member 2 with the cover shown in Fig. 20 removed. Fig. 19 shows a longitudinal section of Fig. 18 on line 20 20 in said figure. Fig. 21 shows a pawl 5. (Shown also in Figs. 17, 18, and 19.) This pawl is adapted to be thrust into the position in which it is shown by its spring 6 shown therein, so that the point of said pawl may enter the groove 7 in the belt-wheel 8, a part of which is shown in Fig. 22, when said pulley is loose on the shaft 1 and is in the position in which it is shown in Figs. 1 and 5, so that the clutch device 9 in said groove 7 may catch the point of the pawl 5 to start the clutch member 2 and the driving-shaft 1 of the main mechanism. In Fig. 1 the inclined end of the stop-fork 10 (shown in Fig. 7) is shown held into the groove 11, shown in the clutch member 2, by its spring 12 and against the inclined shoulder of said pawl 5 (shown in Figs. 21 and 17) so as to hold the pawl 5 back against the force of its spring 6 and out of the groove 7 (shown in Fig. 22) by the spring 12, (shown in Fig. 1,) fast to a pin in said stop-fork 10 and a pin in the hub of the lever 13.

In Fig. 3 the support 14 is shown secured to the bottom of the machine by screws. In Fig. 5 this support is shown to have an upright round part 15, (shown in section,) in which said lower journal 16 of said yoke is rotatably supported, and is also shown in section. Upon said round part the cam-disk 17 (shown in section and having two cam-faces—viz., 18 and 19, shown in Fig. 2)— and a cam-face 20 and a ratchet 21 (shown in Fig. 3) is rotatably supported. The striker-lever 22 and the feed-lever 23 are also shown in section on said round part 15, and the pawls 24 of the feed-lever are in contact with the ratchet 21, as is plain in Fig. 23 at the left. Before said stop-fork 10 is automatically inserted into the position as above described and as shown in Figs. 1 and 5 the clutch member 2 may be turned by hand or by any non-automatic means, whereupon the block 25 on the screw 26, fast in a slide fast to the clutch member 2, is moved back and forth in the slot in the lever 13 and rocks lever 13 on its pivot-screw 27, fast in the frame of the machine, whereupon the lever 13 vibrates the rod 28, pivoted thereto, and rocks said striker-lever, pivoted to said rod on said round part 15, and the feed-screw 29, carried by said striker-lever, strikes the block 30, movably supported on said feed-lever 23, said block 30 having a stud with a roll 31 thereon and in contact with cam-face 20, as shown in dotted lines in Fig. 3 and in full in Fig. 5, and moves said feed-lever and pawls, which, being in contact with said ratchet 21, (shown in Fig. 3,) moves said ratchet 21 and cam-disk fast to said ratchet, and as the cam-disk has the cam-faces above described they are moved, the ratchet device 32 on the right in Fig. 3 preventing backward movement of the cam-disk and the friction-band 33 (shown in Figs. 5 and 3) preventing overthrow thereof, and the spring 34, shown fast to the feed-lever 23 and fast to a hook in the bed of the machine moving the feed-lever in the opposite direction from the movements imparted thereto by the striker-lever, the movement of the feed-lever being limited by the stop-screw 35 (shown in Figs. 23 and 3) striking the support 14. The cam-disk being thus moved, the roll 36 in contact therewith and on the stud 37, fast in slide 38 in slideway 39, (shown in Fig. 4,) moves said slide 38 and stud 37, fast thereto, and as the block 40 is fast to said stud 37 said block is moved, and as the clamp-plate 41 is pivoted to this block, as is shown in Fig. 4, the clamp-plate 41 and clamps 42 and 43 and a material therein are moved, and as the slot 44 in said clamp-plate (shown also in Fig. 14) is over the block 45 (shown in Figs. 2 and 15) and as the block 45 is movably supported on the screw 46, fast in lever 47, fast to stud 48, which is movably supported in the rigid support 49, and as the lever 50 is also fast to the stud 48 and has a roll 51 movably secured to the screw 52, fast in said lever 50, and as the roll 51 is held in contact with the cam-face 19 by the spring 53, fast to the lever 47 and to a hook in the side of the machine, and as the block 45 fits the slot 44 sidewise, the clamp-plate is swung sidewise by said block and is guided by said block, and the clamps on said clamp-plate and the material therein are thus moved diagonally of the first movement imparted to said clamp-plate and clamps, the round part 113, whereupon the clamps may be separated, (shown in Figs. 13 and 16,) on the device 114, the position of which is shown by dotted lines between the clamps in Fig. 14, swinging on its pivot 115, (shown in Fig. 16,) permitting. While the cam-disk is thus moved longitudinally and diagonally of the clamps, the yoke, (shown in Fig. 8,) with the needle-bar bearings 54 and 55, (shown in Figs. 9 and 10,) fast thereto, as shown in Fig. 5, the block 56, fast to and carried by the cam-disk and shown in Figs. 2 and 15, is brought into contact with the slide-bar pin 57, fast to the slide-bar 58, movably mounted in the bearings 59 and 60, and said yoke, the lower journal of which is pivoted, as aforesaid, and the top journal of which is pivoted in the head of the machine, is turned in its bearings gradually, or little by little, and after it is turned one half-revolution and is carried into the position shown in Fig. 5 and operates the latch 61 (shown in Fig. 11) at the next movement the slide-bar pin is forced against the inclined end of the adjustable disconnecting-bar 62, and is thereby disengaged from the block 56 by the slide-bar, being thereby slid in its bearings 59 and 60 against the force of the spring 63, fast to said slide-bar and to a pin in the yoke, and shown in Fig. 5, whereupon the cam-disk is moved on without carrying the yoke, and while the yoke is prevented by said latch 61 from being rapidly turned in the opposite direction by the mainspring 64, secured to the rigid post 65 and to the strap 66, secured to the clamp 67, fast to the lower journal of said yoke and shown in Fig. 3, which main spring had been gradually expanded by said yoke as it had been turned. During the time that the clutch member 2 and shaft 1 is manually turned, as aforesaid, the eccentric 68 and eccentric-strap 69, connected therewith, is moved, whereupon the lever 70, pivoted to said eccentric-strap, is rocked on its pivot 71, and through the ball-and-socket connection between the lever and the needle-bar the needle-bar is forced to cause the needle therein to produce an effect upon a material to be operated upon in said clamps, and the eccentric 72 is also moved in the forked end of the forked lever 73, whereupon the forked lever is rocked on its pivot 74, fast to the arm of the machine, and a roll 75, movably secured to the lower end of the forked lever 73, is moved back and forth in the slot 76, shaped somewhat like a half a rhombus, in the lever 77, pivoted on its pivot-screw 78, and through the ball-and-socket connection between this lever and the lower needle-bar the needle in this bar is also forced to produce an effect upon the material.

The automatic action of the machine is described as follows: When the clamp-lever 79 is pressed, its toe 80 is thereby moved out of its vertical position, whereupon the hinged forked lever (shown in Figs. 14 and 1) under the stress of the spring 112 is forced thereby to seize the material, and a rod (not shown)

may be connected with the clamp-lever 79 for operating the latch or trigger 61, thereby releasing the power in the mainspring 64 of the auxiliary mechanism, whereupon the stored power released instantly operates the auxiliary mechanism, and the yoke is violently turned in its bearings, and the pawl device 81, carried by said yoke and shown in Fig. 15, is struck against the cam device 82, fast to two posts fast to the clamp-plate, and said cam clamp-plate and material therein are moved quickly into cutting position against the force of the spring 83, shown fast to the stud 37 and to a hook on slideway 39 (shown in Fig. 4) under the front end of the clamp-plate, and the inclined part 84 on said yoke (shown in Fig. 8) is struck against the toe of the pawl device 85, hinged in the cutter-lever 86, and the cutter 87, carried by said cutter-lever, is forced to produce an effect on a material on a rawhide cutter-block, (shown best in Fig. 13,) and when the pawl device 81 has passed by the cam device 82 said spring 83 instantly brings the clamp-plate clamps and material into sewing position, and at the same time the yoke is forced against the buffer-rod 88, driving it back against the force of its powerful buffer-spring 89 (shown around the buffer-rod in the slot in the buffer-case 90 and bearing against a shoulder on said buffer-rod) and against the back end of the buffer-case, and said buffer-rod is instantly latched back by the buffer-latch 91, (shown in Fig. 4,) being caused to hook onto the projection 92 on the device on the side of the buffer-case by the buffer-latch spring 93, and the force of the yoke is thereby diminished and power is thus automatically generated and stored in the buffer by the yoke forced by stored power released, and while the buffer-rod is thus forced back the connecting-rod 94, hinged to the buffer-rod is forced in its ways 95 and 96 toward the left in Fig. 1, and the inclined part 97 on said connecting-rod operating on the roll 98, movably secured to the end of the connecting-lever 99, tips the connecting-lever on its pivot 100, and the end thereof acting on the inclined end of the stop-fork 10 rocks it on its pivot and forces the upper inclined end thereof out of the groove 11 in the clutch member 2, (shown in Figs. 5 and 17,) allowing the pawl 5 to be forced by its spring 6 therein into the groove 7 of the belt-wheel, whereupon it is instantly caught by the clutch device 9 in the groove 7, shown in the driving clutch member or belt-pulley, and the clutch members are thus automatically engaged, and the power which may be continuously actuating the driving-clutch member is thereby automatically employed to start and drive the main mechanism, which comprises devices for operating upon the material and devices for automatically generating and storing power in the auxiliary mechanism; and at a proper time or when the operation is finished or when enough power is generated and stored a device 101 (shown on the cam-disk in Fig. 2) forces a device 102 to trip the buffer-latch 91, whereupon the buffer-spring 89 instantly forces the buffer-rod to rebound and carry the connecting-rod 94, hinged to the buffer-rod 88, to the right in Fig. 1, thereby releasing the roll 98 on the connecting-lever 99, whereupon the spring 103, fast to connecting-lever 99 and to the machine, tips the connecting-lever and moves its right-hand end downward, whereupon the spring 12, secured to said stop-fork, instantly pulls the inclined end of the stop-fork 10 into the groove in the clutch member, whereupon the inclined shoulder of the pawl 5 strikes said inclined end of said stop-fork, and the pawl is thereby quickly forced out of contact with the driving-clutch member 2, thereby disconnecting the clutch members, thereby automatically disemploying the continuous power and automatically stopping the main mechanism from operating on the material and yielding catch 104, (shown in Fig. 18,) movably secured to the clutch member 2 by two screws 105 and 106 in a slot shown therein, and fast in said clutch member and fast to the spring 107, fast to a screw in said clutch member, is forced by the violently-moving parts down on the tine 108 of the stop-fork 10, (shown in Fig. 1,) and as the momentum is nearly exhausted acting against the spring the rigid catch 109 is caught by the spring-latch 110, as shown in Fig. 1, the spring-latch thereby preventing the spring 107 from violently whirling the shaft in the opposite direction, thereby stopping the devices from operating on the material without great shock or jar.

Having thus shown and described this invention, I claim as follows:

1. An automatic motory manufacturing-machine made for the special purpose of producing a predeterminate manufacturing operation upon a material held upon a support and then to cease operating thereon, and which comprises means for holding a proper amount of latent motive power while the machine is not in action, and means whereupon a proper amount of power may be generated at each operation of the machine, and means whereupon all the power that is generated in one operation of the machine may be released and utilized as motive power in one operation of the machine, and means adapted to be forced by said power to produce a predeterminate manufacturing operation upon a material held upon a support and then to cease operating thereon.

2. An automatic motory manufacturing-machine made for the special purpose of producing a predeterminate manufacturing operation upon a material held upon a support and then to cease operating thereon, and which comprises means for holding a proper amount of latent motive power while the machine is not in action, and means whereupon a proper amount of power may be generated at each operation of the machine, and means whereupon all the power that is generated in one operation of the machine may be released and utilized as motive power in one operation of the machine, and a support upon which a material may be held, and means for the purpose of being forced by the power released and utilized to produce a predeterminate manufacturing operation upon said material on said support and then to cease operating thereon.

3. An automatic motory manufacturing-machine made for the special purpose of producing a predeterminate manufacturing operation upon a material held upon a support and then to cease operating thereon, and which comprises means for holding a proper amount of latent motive power while the machine is not in action, and means whereupon power may be released and utilized, and means for the purpose of being forced by power released and utilized to produce a predeterminate manufacturing operation upon a material held upon a support and then to cease operating thereon, and means having another power connected therewith to be employed, and means to be driven by the power released and utilized to automatically employ the power to be employed, and means adapted to be forced by the power to be employed to automatically generate the aforesaid power which is held latent to be released and utilized, and means whereupon the power thus employed is automatically disemployed when enough power is generated.

4. An automatic motory manufacturing-machine made for the special purpose of producing a predeterminate manufacturing operation upon a material held upon a support and then to cease operating thereon, and which comprises means for holding a proper amount of latent motive power while the machine is not in action, and means whereupon power may be released and utilized, and means for the purpose of being forced by power released and utilized to produce a predeterminate manufacturing operation upon a material held upon a support and then to cease operating thereon, and means having another power connected therewith to be employed, and means whereupon the power to be employed may be employed, and means forced by the employed power to automatically generate the aforesaid power which is held latent to be released and utilized, and means operated by the released power to cause the generating of power to automatically cease when enough power is generated.

5. An automatic motory manufacturing-machine made for the special purpose of producing a predeterminate manufacturing operation upon a material held upon a support and then to cease operating thereon, and which comprises means for holding a proper amount of latent motive power while the machine is not in action, and means whereupon power may be released and utilized, and means for the purpose of being forced by power released and utilized to produce a predeterminate manufacturing operation upon a material held upon a support and then to cease operating thereon, and means having another power connected therewith to be employed, and means whereupon the power to be employed may be employed, and means to be forced by the employed power to automatically generate the aforesaid power which is held latent to be released and utilized, and means whereupon the power that is employed is automatically disemployed when enough power is generated.

6. An automatic motory manufacturing-machine made for the special purpose of producing a predeterminate manufacturing operation upon a material held upon a support and then to cease operating thereon, and which comprises means for holding a proper amount of latent motive power while the machine is not in action, and means whereupon power may be released and utilized, and means for the purpose of being forced by power released and utilized to produce a predeterminate manufacturing operation upon a material held upon a support and then to cease operating thereon, and means having another power connected therewith to be employed, and means whereupon the power to be employed may be employed, and means forced by the employed power to automatically generate the proper amount of power which is held latent to be released and utilized, and means to be forced by the employed power to continue the operation of the machine upon the material, and means for automatically disemploying the employed power after the operation is finished upon the material and enough power is generated, whereupon the machine ceases its operation.

FRANK L. HARMON.

Witnesses:
HEZEKIAH O. WOODBURY,
ARTHUR C. EBSEN.